Aug. 21, 1962  G. J. LAURENT  3,050,726
RADAR SYSTEM INCLUDING ANTI-JAMMING MEANS
Filed April 23, 1956  2 Sheets-Sheet 1

INVENTOR.
GEORGE J. LAURENT
BY
ATTORNEY

United States Patent Office 3,050,726
Patented Aug. 21, 1962

3,050,726
RADAR SYSTEM INCLUDING ANTI-JAMMING MEANS
George J. Laurent, Jenkintown, Pa., assignor, by mesne assignments, to Philco Corporation, Philadelphia, Pa., a corporation of Delaware
Filed Apr. 23, 1956, Ser. No. 579,791
9 Claims. (Cl. 343—17.1)

The present invention relates to radar systems and more particularly to radar systems including means for changing the frequency of operation to avoid interfering signals.

The rapid development of military radar systems in recent years has been matched by an almost equally rapid development of anti-radar devices. Probably the most effective and troublesome anti-radar device likely to be encountered by an airborne radar system is an automatic jammer system. Recent types of automatic jammer systems include receiver circuits for listening for transmissions from hostile radar systems. When such transmissions are received the receiver circuits determine the frequency at which the detected radar system is operating. Additional circuits cause a jamming transmitter to be tuned to this frequency and to transmit either continuous wave or pulse type signals which are, in turn, received by the radar receiver. If the jamming signals appearing at the output of the radar receiver are not very large they will appear only as a slight increase in the noise level of the receiver and will not adversely affect the operation of the radar system. If the jamming signals at the output of the radar receiver are very large they may have several deleterious effects. In radar systems employing bright trace indicators a strong jamming signal may cause a large section of the indicator screen to be brightly illuminated. The illumination may be sufficient seriously to impair the dark adaptation of the radar operator. Recovery of the dark adaptation on the part of the operator may require several minutes to more than an hour depending on the intensity of the illumination of the radar screen. During this period of readjustment the radar operator may not be able to discern faint but important targets appearing on the radar screen. Another deleterious effect resulting from the application of large amplitude jamming signals to the indicator is a temporary loss of contrast in the radar presentation due to persistence in the phosphors of the screen. Several minutes are required before a signal at the maximum level accepted by the indicator fades to the point where it is no longer noticeable. Even an occasional large amplitude jamming signal may seriously impair the operation of the radar system if the system includes memory circuits such as storage tubes or sweep integrators.

Present day radar receivers are insensitive to signals differing by more than a few megacycles from the frequency to which the receiver is tuned. For example, one radar receiver currently in use is insensitive to signals which are more than twenty megacycles removed from the frequency to which it is tuned. Many radar receivers include means under control of the radar operator for rapidly switching the operating frequency of the radar transmitter. Means are provided in such systems for causing the tuning of the radar receiver to follow the changes in frequency of the transmitter. However, these controls are not sufficient to avoid the effects of an automatic jammer for several reasons. First, the radar operator may and usually does have duties other than operating the radar system. Therefore any adjustments he must make on the radar system diverts his attention from these other duties. Secondly, a strong jamming signal may appear suddenly on the radar screen and hence impair the operator's dark adaptation or the contrast of the indicator before the operator has an opportunity to change the tuning of the radar system. Thirdly, if a jamming signal of intermediate amplitude appears the operator must make a decision as to whether or not the signal is of sufficient amplitude to be objectionable. This decision takes time and diverts the operator's attention from other duties. Finally, automatic jammers may operate with such rapidity that they will follow the manual manipulations of the frequency by the radar operator.

Despite their high degree of effectiveness, jammers are subject to certain weaknesses. In general it is not practical for a jammer to track a radar system with its antenna. Therefore an antenna having a relatively broad radiation pattern must be employed. This, coupled with other limitations on the power output of the jammer systems, prevents a single jammer system from blanketing a wide band of frequencies. Instead the jammer must detect the frequency of operation of the radar system and then transmit on that frequency. In a typical jammer system the jamming transmission is interrupted 40 times a second while the jammer receiver listens to see if the radar system is still transmitting on the same frequency. This listening period must be fairly long in order to permit echo signals resulting from the reflections of the signals from the jamming transmitter to die down. In some instances the listening period may be several thousand microseconds. The period may be even longer if the signals received by the jamming receiver indicate that the frequency of the jamming transmitter should be changed.

It is an object of the present invention to provide an improved radar system which is capable of operating in the presence of a jamming transmitter. It is a further object of the present invention to provide novel means for automatically changing the tuning of a radar receiver in the presence of a jamming signal.

Still another object of the present invention is to provide a modification of existing radar systems for blocking jamming signals of objectionable level and/or for changing the tuning of radar system in the presence of these jamming signals.

Still another object of the present invention is to provide a circuit for blocking jamming signals and/or for changing the tuning of the radar system in response to jamming signals which exceed a predetermined amplitude at the output of the radar receiver.

In accordance with the present invention the presence and amplitude of jamming signals are detected by providing a detector which is coupled to the output of the radar receiver only at times when no radar echoes are received. In an airborne radar system, for example, operating at an altitude of 40,000 ft. there is a delay of the order of 80 microseconds before the first ground reflected echoes are received. Signals occurring in this 80 microsecond period must originate from an interfering source rather than from object reflected echoes. Means responsive to the output of the detector are provided for changing the frequency of the radar transmitter and/or disconnecting the output of the radar receiver from the indicator.

For a better understanding of the present invention together with other and further objects thereof reference should be made to the following detailed description which is to be read in conjunction with the accompanying drawings in which.

Figure 1:
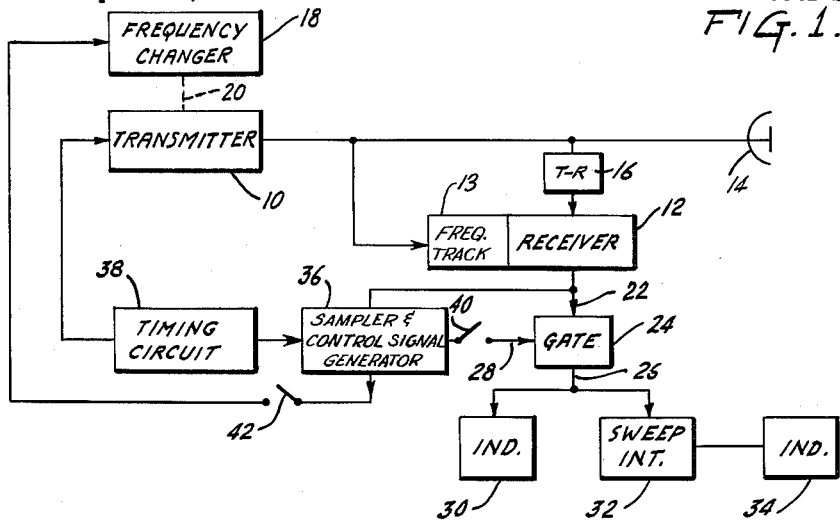
FIG. 1 is a block diagram of one preferred embodiment of the present invention.

Turning now to FIG. 1 the radar system of the present invention includes a transmitter 10, a receiver 12, an antenna 14 and a duplexer or tranmit-receive device 16 which connects the antenna 14 to the receiver 12. A frequency changer 18 is associated with transmitter 10 for controlling the frequency of operation thereof. In one radar system now in current use the frequency is changed by energizing a motor which controls the tuning of a tunable magnetron. Block 18 may represent the motor and the tunable magnetron may be included in transmitter 10. Therefore the connection between block 18 and transmitter 10 is shown as a broken line 20 representing a mechanical connection. However, it is to be understood that other forms of transmitter tuning may be employed and the connection between the frequency changer 18 and the transmitter 10 may be either mechanical or electrical in nature. Receiver 12 includes frequency tracking circuit 13 which causes the local oscillator frequency to follow the changes in the transmitter frequency thereby to maintain a constant intermediate frequency signal in the receiver 12. Frequency tracking circuit 13 will not be described in detail since circuits of this type are presently in use in several forms of radar systems and for this reason are well known to those skilled in the radar art. An example of a suitable frequency tracking circuit is shown in detail in the U.S. patent to Persa R. Bell, Jr., 2,627,024, issued January 27, 1953. A further description of suitable frequency tracking circuits is contained in Radiation Laboratory Series, volume 16 (Microwave Mixers), McGraw-Hill Book Company, Inc., 1948, at chapter 7.

The output of receiver 12 is supplied by way of connection 22 to a gate circuit 24. Gate circuit 24 is so arranged that it will pass a signal from connection 22 to output connection 26 unless a signal is supplied to a second input connection 28 of gate circuit 24. Gate circuit 24 may be a pentode amplifier stage in which the control grid is coupled to connection 22 and in which the screen grid or suppressor grid is coupled to the connection 28. Preferably, however, a balanced gate is employed so that the gating signal does not appear at the output of circuit 24. Signals are supplied by way of connection 26 to the utilization circuits of the radar system. These utilization circuits may include cathode-ray tube indicators, moving target detection systems, sweep integrator or re-entrant data processing circuits or the like. These utilization circuits have been indicated generally in FIG. 1 by the block 30 representing a cathode-ray tube indicator and by blocks 32 and 34 representing a sweep integrator 32 having a second cathode-ray tube indicator 34 connected to the output thereof.

The video signals appearing at output connection 22 of receiver 12 are also supplied to one input of a sampler and control signal generator circuit 36. Sampler circuit 36 receives a second input from timing circuit 38. Timing circuit 38 is the master timing control for the radar system. This circuit has two outputs, one to the sampler 36 and the second to the transmitter 10. These two signals bear a fixed time relationship to each other but they do not occur at the same time and preferably they are of different time durations. In the embodiment shown in FIG. 1 it is assumed that signals from timing circuit 38 control the time of transmission of signals from transmitter 10. However, in certain radar systems the time of transmission of pulses is controlled by mechanical means. In such a system it may be desirable to reverse the flow of signals between timing circuit 38 and transmitter 10. That is, it may be desirable to so arrange timing circuit 38 that it supplies a signal to sampler 36 at a time which bears a preselected time relationship to the time of occurrence of a signal supplied to timing circuit 38 from transmitter 10.

One output of sampler 36 is connected to input 28 of gate circuit 24 through a switch 40. A second output of sampler 36 is supplied to an input of frequency changer 18 through a switch 42. Switches 40 and 42 are not essential to the operation of the present invention but are included merely to show that the signals from sampler 36 may control either gate 24 or frequency changer 18 or both of these circuits as desired.

Figure 2:
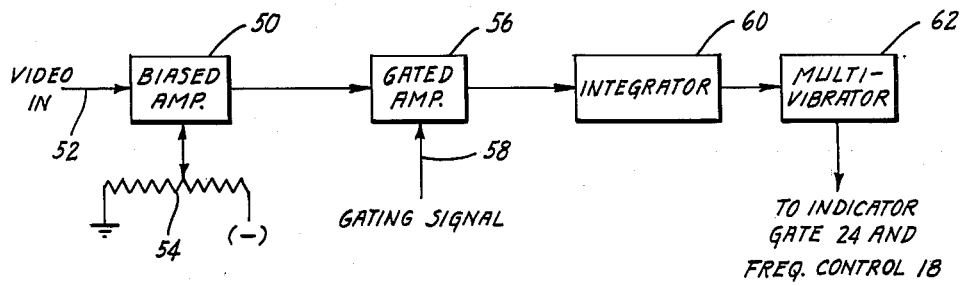
FIG. 2 is a block diagram of one form of sampler circuit which may be used in the circuit of FIG. 1.

Turning now to FIG. 2 the sampler and control signal generator circuit 36 of FIG. 1 may comprise a biased amplifier 50 which receives a video signal by way of input connection 52. Potentiometer 54 schematically represents means for biasing amplifier 50 so that it will pass only signals above a predetermined amplitude. Amplifier 50 may be a conventional video amplifier stage which is biased a preselected amount below signal cutoff by potentiometer 54. The video signals in the output of biased amplifier 50 are supplied to an input of gated amplifier 56. Gated amplifier 56 also recieves a gating signal from the timing circuit 38 of FIG. 1 by way of input connection 58. This gating signal may be in the form of a pulse of 50 microseconds duration occurring at a time just following the transmission of a signal by the radar transmitter. In practice, gated amplifier 56 may be a high gain amplifier circuit which includes at least one stage having a second control grid to receive the gating signal supplied by way of connection 58.

The video signals from gated amplifier 56 are supplied to an integrator 60 which provides an output signal equal to the average value of the received signals during the gating period. The output signal of integrator 60 is supplied to a control input of a multivibrator 62. Multivibrator 62 supplies the actual gating signal to gate circuit 24 of FIG. 1 and to the frequency changer 18 of FIG. 1.

The operation of the circuit of FIG. 2 will now be explained. In a typical radar system the maximum output of the radar receiver may be limited to a four volt peak signal by suitable limiter circuits in the receiver. Usually noise signals up to one-fourth the blooming signal level of the indicator employed are not objectionable on the screen of the radar receiver. However, if interfering signals exceed in magnitude one-half the total permissible magnitude of the receiver output, in this example an amplitude of two volts, they may interfere with the operation of the radar system. Therefore, in the circuit of FIG. 2, potentiometer 54 may be adjusted so that only signals at input connection 52 which exceed one-half the maximum input signal are passed to gated amplifier 56. In the example mentioned above, potentiometer 54 would be set so that only video signals having a peak amplitude of more than 2 volts would be passed to gated amplifier 56. It should be understood that only the portion of the video signal which exceeds 2 volts, or the bias set by potentiometer 54, will be passed to gated amplifier 56. Placing the biased amplifier 50 in a position following the radar receiver has several advantages. For example, when the radar system is used for general navigation purposes, the receiver is normally operated at a relatively high gain. Therefore even jamming signals of small amplitude may be objectionable. Once a desired target is located the operator may decrease the gain of the radar receiver until the desired target is just visible on the screen. In this case jamming signals which were previously objectionable may no longer have sufficient amplitude at the output of the receiver to adversely affect the operation of the radar system. Decreasing the gain of the radar receiver will provide a corresponding decrease in the amplitude of all jamming signals supplied by way of input connection 52 to biased amplifier 50 which are not of sufficient amplitude to saturate the receiver even at minimum gain. Therefore biased amplifier 50 will prevent the circuits which follow it from responding to jamming signals which are not of an objectionable level. The effectiveness of a jamming signal depends upon its amplitude at the output of the receiver rather than on its amplitude at the antenna of the radar system. For example, if the radar receiver is operating at high gain, a relatively small amplitude jamming signal may be sufficient to cause an objectionable indication to appear on the screen of the indicator. On the other hand if the radar receiver is operating at a relatively low gain, a much larger amplitude jamming signal will be required at the radar antenna of the receiver before jamming signals of objectionable amplitude appear at the output of the receiver. Since biased amplifier 50 follows the radar receiver, potentiometer 54 may be adjusted to what is considered to be an objectionable level of interfering signals on the indicator screen and interfering signals will be maintained below this level even though the gain of the radar receiver is changed.

The gating signal supplied by way of input connection 58 is made as long as possible so that the operation of the sampler circuit will be insensitive to occasional strong signals which may be received from other radar systems operating in the area. A single strong impulse received during the 50 microsecond period would produce only a small amplitude signal at the output of integrator 60.

Multivibrator 62 is preferably a unistable multivibrator circuit which is triggered to a second quasi-stable state by a signal supplied by integrator 60. Preferably this second stable state has a time duration equal to one interpulse period less the duration of the gating signal supplied to amplifier 56. Multivibrator 62 represents a form of short time constant control of the gate 24 and frequency changer 18 of FIG. 1. That is, multivibrator 62 controls gate circuit 24 and frequency changer 18 in response to jamming signals received during a single interpulse period. This rapid control of the gate circuit 24 is helpful in providing at least limited operation of the radar system in the presence of strong jamming signals. As mentioned earlier, in some types of jamming systems the jamming transmission is interrupted several times a second while the jammer system receiver listens to see if the radar system is still transmitting at the same frequency. During this listening period the radar system may have several jam-free interpulse periods in which to operate. Since the number of jam-free intervals will be limited it is essential that received target echo signals be supplied to the radar indicator or to the signal processing circuits as soon as the jamming signals have been reduced below an objectionable amplitude. In the circuit of FIG. 2, if the signals received during a current interpulse period do not exceed what has been selected as an objectionable level, multivibrator 62 will not operate and signals will be passed from receiver 12 of FIG. 1 to the indicator 30 and sweep integrator 32. Frequency changer 18 may not be able to respond to a signal received every interpulse period. Also, in some instances it may be desirable to shift the frequency of operation of the radar receiver only if jamming signals are received during several successive interpulse periods. For these and other reasons it may be desirable to provide a long time constant averaging or integrating circuit between the output of multivibrator 62 and the frequency changer 18. Since the nature and manner of connecting averaging circuits are well known this feature will not be further described.

Figure 3:
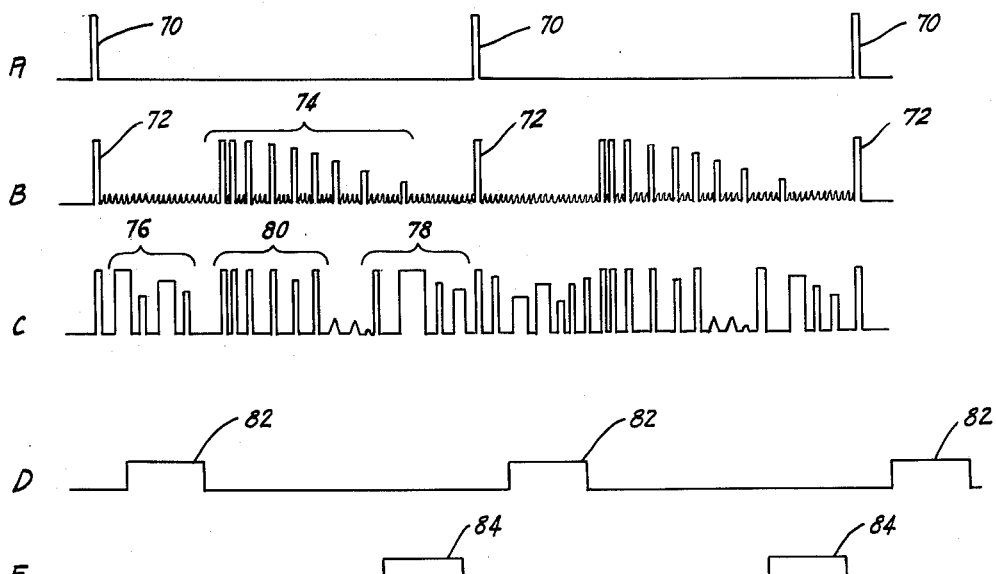
FIG. 3 is a group of waveforms which illustrate the operation of the preferred embodiment of the invention shown in FIG. 1.

In FIG. 3 pulses 70 in waveform A represent the pulses supplied by timing circuit 38 to transmitter 10. Waveform B in FIG. 3 represents the video signal which would appear at the output of receiver 12 in the absence of any jamming signal. Pulses 72 represent the transmitted pulse and signals 74 represent target echo signals. A small amount of thermal noise will appear in the output of the receiver in the interval between transmitted pulse 72 and received echo 74 and also in the interval following the last received pulse. This noise is represented by the irregular base line in waveform B. Waveform C of FIG. 3 represents the signal at the output of a receiver of an airborne radar system in the presence of signals from a pulse type jammer. The signals 76 in waveform C represent jamming signals received in the interval before first echoes are returned from the ground. Signals 78 represent jamming signals which are received after the last echoes have been returned from the ground. Jamming signals will also be interspersed with the target echo signals 80 in waveform C. Waveform D in FIG. 3 represents the gate signals supplied by timing circuit 38 to sampler 36. It will be noted that the gate pulses 82 in waveform D are synchronized with the transmitted pulses 72 of the radar system and occupy a time interval between the transmitter pulse 72 and the received echoes 74 of waveform B. The length of this interval, and hence the maximum permissible duration of pulses 82, will depend upon the altitude at which the radar system is operating. Waveform E of FIG. 3 represents an alternative placement of the gating signals supplied by timing circuit 38 to sampler 36. It will be noted that the sampling pulses 84 of waveform E occurred a time just prior to the occurrence of the next transmitted pulse. Placing the gate in this position has the advantage that it eliminates the minimum altitude restriction which is present if the gate is placed as shown in waveform D. However, it has the disadvantage that, in radar systems employing variable interpulse periods, means must be provided for changing the delay between the occurrence of a transmitted pulse and the occurrence of gate pulse 84 each time the repetition rate of the radar system is changed. It also has the disadvantage that, under certain operating conditions, echo signals may be obtained from fairly long range. If these echo signals occur within the gate interval 84 that may cause gate 24 of FIG. 1 to block the passage of signals from receiver 12 to indicator 30 and sweep integrator 32 in the following interval even though no jamming signals are present. These echoes may also bring about an undesired change in frequency of the radar system. The choice as to whether the gating signal should be located just following the transmitted pulse or just prior to the next transmitted pulse will depend upon the conditions under which the radar system is to operate.

Turning now to the operation of the system of FIG. 1 transmitter 10 supplies a signal in the usual manner to antenna 14. The received echo signals are channeled by transmit-receive device 16 to receiver 12. The received signals are supplied to sampler 36 and to gate 24. If switch 40 is open or if no jamming signals above the preselected objectionable level are present in the output of receiver 12, the video signals in the output of receiver 12 are passed to indicator 30 and sweep integrator 32. If switch 40 is closed and there are jamming signals present in the output of receiver 12 which are above the preselected objectionable level, sampler 36 operating in the manner described above will supply a gate signal to gate circuit 24 which will act to block the passage of video signals from receiver 12 to indicator 30 and sweep integrator 32. If switch 42 is closed, a signal will also be supplied from sampler 36 to frequency changer 18. This signal will cause frequency changer 18 to shift the frequency of transmitter 10. In some instances it may not be feasible to shift the frequency of transmitter 10 to avoid a jamming system. In such instances switch 42 may be left open. If switch 42 is left open the system of FIG. 1 still will cause signals to be supplied from receiver 12 to indicator 30 and sweep integrator 32 only during the listening periods of a jamming system or when, for other reasons, the jamming signal has an amplitude below preselected level.

Figure 4:
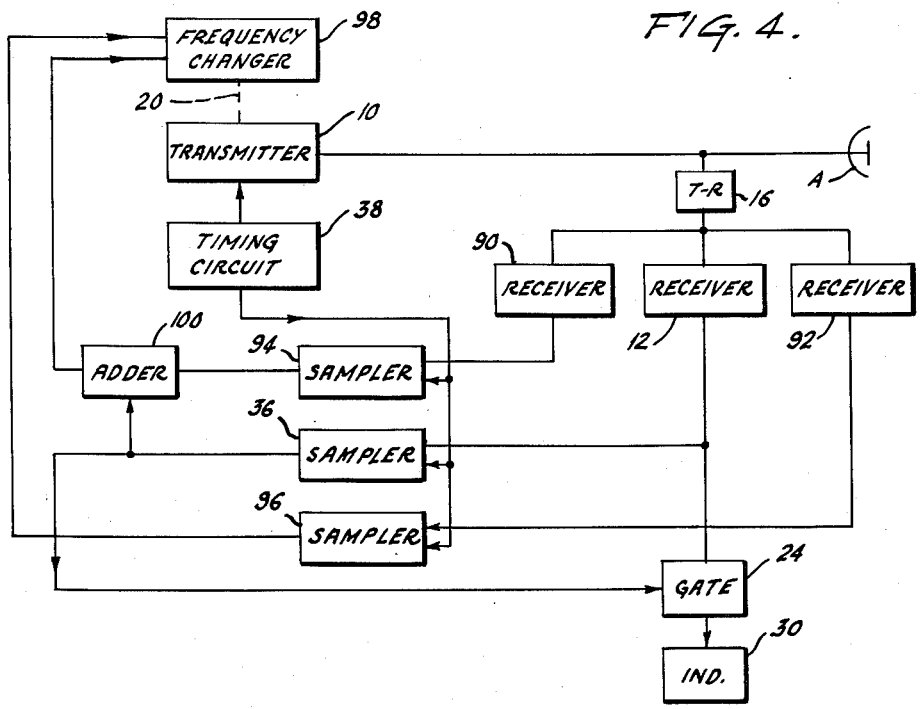
FIG. 4 is a block diagram of a second preferred embodiment of the present invention.

The system of FIG. 4 is a modification of the system shown in FIG. 1. Parts in FIG. 4 corresponding to like parts in FIG. 1 have been given the same reference numerals. The system of FIG. 4 differs from the system of FIG. 1 in that it includes two additional receivers 90 and 92 which are tuned, respectively, to frequencies above and below the frequency to which receiver 12 is tuned. Receivers 12, 90 and 92 may include suitable frequency tracking circuits (not shown) which are similar to frequency tracking circuit 13 of FIG. 1. The receivers 90 and 92 may be entirely separate from receiver 12 or they may include some circuits in common with receiver 12. The receivers 90 and 92 establish guard bands on either side of the frequency which receiver 12 is operating. The signal from receiver 90 is supplied to a sampler 94 which may be similar in construction to sampler 36. Receiver 92 supplies a signal to a sampler 96 which again may be similar to sampler 36. The output of sampler 36 is connected to gate 24 as before. Therefore only jamming signals in the output of receiver 12 will result in the interruption of the transfer of video signals from receiver 12 to indicator 30. The output of sampler 96 is supplied to one input of frequency changer 98. Frequency changer 98 may be similar to frequency changer 18 of FIG. 1 except that it is arranged to change the frequency of transmitter 10 in a selected one of two directions depending on which of the two inputs of frequency changer 98 is energized. If receiver 92 is tuned above the frequency to which receiver 12 is tuned, signal from sampler 96 will cause frequency changer 98 to decrease the frequency at which transmitter 10 operates. Therefore the frequency of operation of transmitter 10 will move away from the frequency at which the jamming system is operating.

The signal from sampler 94 is connected to a second input of frequency changer 98 through an adder circuit 100. If receiver 90 is tuned below the frequency to which receiver 12 is responsive, the signal from sampler 94 will cause frequency changer 98 to increase the frequency at which transmitter 10 is operating. This will again cause the radar system to move in frequency away from the frequency on which the jammer system is operating. The output of sampler 36 is supplied to a second input of adder 100. Adder 100 may be a linear adder circuit in which an output signal is generated if a signal is supplied to either input. Thus a signal from sampler 36 will cause frequency changer 98 to shift the operation of transmitter 10 to a higher frequency. If the connection from sampler 36 to frequency changer 98 is not provided a jamming signal which suddenly appeared exactly on the frequency to which receiver 12 was tuned might not actuate either sampler 94 or 96 and the frequency changing system would be ineffective to shift the operation of the radar system to a frequency not covered by the jammer system. It is believed that the operation of the system of FIG. 4 requires very little explanation. The system of FIG. 4 is particularly useful against jamming systems which sweep in frequency until they coincide with the frequency of a radar system operating in the area. Receivers 90 and 92 will cause frequency changer 98 to shift continually the operation of transmitter 10 to avoid the transmissions of the jammer system. In order for the system of FIG. 4 to be effective it is necessary that frequency changer 98 be able to change the operating frequency of transmitter 10 at least as fast as the jamming system can change its frequency.

No means have been shown in FIG. 4 for disconnecting the outputs of samplers 94, 36 and 96 from the frequency changer 98 or the gate circuit 24. Such means may be provided if necessary. If receivers 90 and 92 are tuned to frequencies remote from the passband of receiver 12, no echoes will be detected by these receivers and the samplers 94 and 96 may be omitted.

The systems of FIGS. 1 and 4 have been described in terms of their operation in the presence of an intentional jamming signal. It should be obvious to those skilled in the art that the source of the interfering signal is not important. That is, the systems of FIGS. 1 and 4 will act to exclude interfering signals from whatever source they may originate. For example, if a second radar system is operating on nearly the same pulse repetition period and frequency within the same area, the system of FIG. 1 would cause the frequency of transmitter 10 to change to avoid the interfering signals which would appear at the output of receiver 12. In this case the interfering signals might manifest themselves as target echo signals appearing within the interval 76 of FIG. 3C.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. In a radar system including a pulse type transmitter, a receiver of object reflected signals which is continuously tuned to receive echoes of the signals radiated by said transmitter, and a signal utilization device connected to the output of said receiver, means for sampling the output of said receiver at intervals normally free of object reflected echo signals, and means coupled to said receiver and responsive to sample signals supplied by said sampling means during one sampling period which exceed a preselected amplitude for excluding from said utilization device during a selected internal next following said sampling interval in which said signals of excessive amplitude occur, signals derived from received signals which are of approximately the same frequency as the received signals resulting in said sample signals of excessive amplitude.

2. In a radar system including a pulse type transmitter, a receiver which is tuned to receive object reflected echoes of signals radiated by said transmitter, and a signal utilization device connected to the output of said receiver, means for sampling the output of said receiver at intervals normally free of object reflected echo signals, means responsive to sample signals supplied by said sampling means for generating a control signal for each sampling interval in which said sample signals exceed a preselected amplitude, and means coupled to said receiver and responsive to said control signals for immediately decoupling said receiver from said signal utilization device for a time interval equal to a large fraction of an interpulse period of said pulse type transmitter.

3. In a radar system including a pulse type transmitter, means associated with said transmitter for altering the frequency of operation thereof, a receiver of object reflected echo signals which is continuously tuned to receive object reflected echoes of signals radiated by said transmitter, means for sampling the output of said receiver at intervals normally free of object reflected echo signals, means responsive to sample signals supplied by said sampling means for generating a control signal for each sampling interval in which said sample signals exceed a preselected amplitude, and means associated with said transmitter and responsive to said control signals for causing the frequency of operation of said transmitter to be altered by an amount greater than the bandwidth of said receiver.

4. In a radar system a combination comprising a transmitter for supplying pulse modulated radio frequency signals, a receiver of object reflected echo signals which is continuously tuned to receive object reflected echoes of signals radiated by said transmitter, a signal utilization device, signal actuatable gate means connecting the output of said receiver to said signal utilization device, said gate means, when actuated, being incapable of passing a signal from said receiver to said signal utilization device, signal actuatable means associated with said transmitter for altering the frequency of operation thereof, means for sampling the output of said receiver at intervals normally free of object reflected echo signals, means responsive to sample signals from said sampling means for generating a control signal for each sampling interval in which said sample signals exceed a preselected amplitude, means for selectively supplying said control signal to at least one of the two circuits comprising said gate means and said means for altering the frequency of said transmitter.

5. In a radar system, the combination comprising a transmitter for supplying pulse modulated radio frequency signals, a receiver of object reflected echo signals which is continuously tuned to receive object reflected echoes of signals radiated by said transmitter, a signal utilization device, signal actuatable gate means connecting the output of said receiver to said signal utilization device, said gate means, when actuated, being incapable of passing a signal from said receiver to said signal utilization device, signal actuatable means associated with said transmitter for altering the frequency of operation thereof, said means for altering the frequency of said transmitter, when actuated, causing a preselected shift in the operating frequency of said transmitter, means for sampling the output of said receiver at intervals contiguous with the intervals in which transmission of said pulses supplied by said transmitter occurs, means responsive to sample signals supplied by said sampling means for generating a control signal for each sampling interval in which said sample signals exceed a preselected amplitude, and means for supplying said control signals selectively to at least one of said two circuits comprising said gate means and said means for altering the frequency of said transmitter.

6. A radar system as recited in claim 5 wherein said sampling interval follows the time of transmission of said pulses.

7. A radar system comprising a transmitter for supplying pulse modulated radio frequency signals, timer means associated with said transmitter for controlling the time of transmission of said pulses, means associated with said transmitter for controllably altering the frequency of operation of said transmitter, a receiver of object reflected echo signals, a signal utilization device, gate means connecting the output of said receiver to said signal utilization device, said gate means being normally operative to pass a signal, and sampling means having a signal input connected to the output of said receiver, a control input connected to an output of said timer means and signal outputs connected to said gate means and to said frequency altering means, said timer means being arranged to actuate said sampling means during time intervals substantially contiguous with the time intervals in which the transmission of said pulses occur, means responsive to sample signals received from said sampling means for generating a control signal for each sampling interval in which said sample pulses exceed a preselected amplitude, said gate means being responsive to a control signal received from said control signal generating means to block the passage of signals from said receiver to said signal utilization device, said frequency altering means being responsive to a control signal received from said control signal generating means to alter the frequency of operation of said transmitter by a preselected amount.

8. The radar system of claim 7 wherein said sampling means comprises an amplitude selection circuit constructed and arranged to pass only signals above a preselected amplitude, a gated amplifier connected to the output of said amplitude selection circuit, an averaging circuit connected to the output of said gated amplifier, said averaging circuit being arranged to average the output of said gated amplifier over an interval which is substantially less than one interpulse period of said radar system and signal generating means connected to said averaging circuit, said signal generating means being constructed and arranged to supply a control signal to said gate means and to said frequency controlling means in response to a signal supplied by said averaging circuit and having an amplitude at least equal to a preselected amplitude.

9. A radar system comprising a transmitter for supplying pulse modulated radio frequency signals, means associated with said transmitter for controllably altering the frequency of operation of said transmitter, said frequency altering means having first and second inputs, said frequency altering means being so constructed and arranged that energization of said first input results in an alteration in frequency in a first direction and that energization of said second input results in an alteration in frequency in the opposite direction, means for receiving signals on three adjacent frequency channels, a signal utilization device, gate means connecting the output of said receiving means to said signal utilization device, said gate means being normally operative to pass signals received on the center of said three frequency channels to said signal utilization device, means for separately sampling the signals received on said three channels at times bearing a preselected relationship to the time of transmission of said pulse modulated radio frequency signals, means connecting said sampling means to said gate circuit and to said first and second inputs of said frequency altering means, said sampling means and said connecting means being so constructed and arranged that sample signals corresponding to said center channel are supplied to said gate circuit to render said gate circuit inoperative to pass signals, sample signals corresponding to said center channel and one side channel are supplied to said first input of said frequency altering means thereby to energize said first input, and sample signals corresponding to the other side channel are supplied to said second signal input of said frequency altering means thereby to energize said second input.

References Cited in the file of this patent

UNITED STATES PATENTS

| | | |
|---|---|---|
| 2,204,954 | Anderson | June 18, 1940 |
| 2,427,523 | Dolberg | Sept. 16, 1947 |
| 2,747,179 | Kaplan | May 22, 1956 |